UNITED STATES PATENT OFFICE.

HENRY HUSSEY VIVIAN, OF SWANSEA, ENGLAND.

PROCESS OF MANUFACTURING COPPER.

SPECIFICATION forming part of Letters Patent No. 437,265, dated September 30, 1890.

Application filed June 14, 1890. Serial No. 355,491. (No model.)

*To all whom it may concern:*

Be it known that I, Sir HENRY HUSSEY VIVIAN, baronet, a subject of the Queen of Great Britain, residing at Hafod Works, Swansea, in the county of Glamorgan, Wales, have invented certain new and useful Improvements in the Process of Manufacturing Copper; and I do hereby declare that the following is a full, clear, and exact description of the invention, which will enable others skilled in the art to which it appertains to make and use the same.

My improvements consist in submitting copper in a finely-divided oxidized condition to the action of chemical reagents—such as hereinafter mentioned—previous to refining it in the dry way, in order as far as possible to dissolve out such substance as may be hurtful to its quality. For this purpose, if the copper is in a metallic form, I melt, granulate, and calcine it and grind the resulting oxide. If it is in the state of matte, I grind and calcine it so as to reduce it into a fine oxidized condition. Precipitates, if sufficiently rich and iron-free, may be at once calcined. Residues which have been heated for the extraction of silver, being already in a fine oxidized condition, are fit for immediate treatment. If they result from the salt or chlorination process of silver extraction, no salt need be added. If the material to be treated has not been submitted to a previous chlorination process, I find it desirable to add salt to the copper oxide previous to withdrawing it from the calciner, the mass being at the same time well mixed and stirred, as in the ordinary chlorination process. I then lixiviate the copper oxide with a weak solution of an organic acid, or of a salt of such acid. For this purpose I prefer to use tartaric acid. I have found that by the use of two pounds of that acid per ton of oxide I am able to dissolve out such a proportion of arsenic, antimony, gold, silver, and other foreign substances and impurities as to render the copper of high quality, suitable for electrical uses, although, of course, the amount of acid employed must more or less depend on the amount of the foreign substances present in the copper. The strength of the tartaric-acid solution I prefer to use is one pound of acid to one hundred pounds of water. I then place insoluble anodes in the liquor resulting from the lixiviation of the oxide of copper, and by passing an electric current through it I separate the impurities contained in it as well as any copper which may have been dissolved out. The liquor will then be in a condition to use over again. I find that even without the use of salt the impurities are dissolved out, but not so readily.

What I claim is—

1. The herein-described method of manufacturing copper, which consists in preparing the copper-containing material in a finely-divided form, treating it with an organic acid and then reducing it to the metallic state.

2. The herein-described method of manufacturing copper, which consists in preparing a finely-divided oxide of copper, then treating it with an organic acid to dissolve out and separate therefrom metallic impurities, and then reducing the oxide of copper to the metallic state.

3. The herein-described process for the manufacture of copper, consisting in calcining oxide of copper with common salt, then treating said oxide with an organic acid to separate metallic impurities therefrom.

4. The herein-described method of manufacturing copper, which consists in preparing the copper-containing material in a finely-divided form, treating it with tartaric acid, and then reducing it to the metallic state.

HENRY HUSSEY VIVIAN.

Witnesses:
 HENRY LEAKEY,
 PHILIP WALTER PHILLIPS,
*Clerks to Messieurs Stricks & Bellingham,
 Solicitors, Fisher Street, Swansea.*